(12) United States Patent
Maeding et al.

(10) Patent No.: US 12,095,916 B2
(45) Date of Patent: Sep. 17, 2024

(54) CHAINED MANIFEST FOR KEY MANAGEMENT AND ATTESTATION

(71) Applicant: INTERNATIONAL BUSINESS MACHINES CORPORATION, Armonk, NY (US)

(72) Inventors: Nicolas Maeding, Holzgerlingen (DE); Angel Nunez Mencias, Stuttgart (DE); Stefan Liesche, Boeblingen (DE)

(73) Assignee: International Business Machines Corporation, Armonk, NY (US)

( * ) Notice: Subject to any disclaimer, the term of this patent is extended or adjusted under 35 U.S.C. 154(b) by 312 days.

(21) Appl. No.: 17/648,837

(22) Filed: Jan. 25, 2022

(65) Prior Publication Data
US 2023/0239148 A1   Jul. 27, 2023

(51) Int. Cl.
*H04L 29/06* (2006.01)
*H04L 9/08* (2006.01)

(52) U.S. Cl.
CPC .......... *H04L 9/0894* (2013.01); *H04L 9/0825* (2013.01); *H04L 9/085* (2013.01); *H04L 9/0861* (2013.01)

(58) Field of Classification Search
CPC ... H04L 9/0894; H04L 9/3268; H04L 9/0891; H04L 9/0861; H04L 9/0825; H04L 9/085
See application file for complete search history.

(56) References Cited

U.S. PATENT DOCUMENTS

| 10,958,424 | B1 * | 3/2021 | Chhabra | ................ | H04L 9/083 |
| 2018/0248688 | A1 | 8/2018 | Kumar | | |
| 2019/0044706 | A1 | 2/2019 | Gauda | | |
| 2019/0132120 | A1 | 5/2019 | Zhang | | |
| 2019/0273611 | A1 | 9/2019 | Mullins | | |
| 2020/0074103 | A1 * | 3/2020 | Volkanov | ............ | G06F 21/6218 |

(Continued)

FOREIGN PATENT DOCUMENTS

WO    2023143934 A1    8/2023

OTHER PUBLICATIONS

Mell et al., "The NIST Definition of Cloud Computing", National Institute of Standards and Technology, Special Publication 800-145, Sep. 2011, 7 pages.

(Continued)

*Primary Examiner* — Tri M Tran
(74) *Attorney, Agent, or Firm* — Kimberly Zillig

(57) ABSTRACT

A computer-implemented method for managing a life-cycle of at least in parts interdependent cryptographic keys is disclosed. Each of the cryptographic keys is signed and relates to a different one of artifacts. The method comprises creating a key manifest, wherein the key manifest comprises data about determined dependencies of the cryptographic keys at a point in time when one of the artifacts is built encrypting the key manifest with a manifest key, and upon a life-cycle change happening to one out of the group comprising one of the artifacts and one of the interdependent cryptographic keys in the key manifest of the one of the artifacts, the method comprises decrypting the key manifest and invoking an action to a related one out of the group comprising the one of the artifacts and at least one of the interdependent cryptographic keys in accordance with the key manifest.

14 Claims, 7 Drawing Sheets

(56) References Cited

U.S. PATENT DOCUMENTS

2022/0121749 A1\* 4/2022 Liu ...................... H04L 9/3239

OTHER PUBLICATIONS

Notification of Transmittal of the International Search Report and the Written Opinion of the International Searching Authority, or the Declaration, International Application No. PCT/EP2023/050779, Apr. 12, 2023, 10 pgs.

"Certificate revocation list", Wikipedia, downloaded from the Internet on Mar. 1, 2024, 5 pages, <https://en.wikipedia.org/wiki/Certificate_revocation_list>.

\* cited by examiner

CHAINED MANIFEST FOR KEY MANAGEMENT AND ATTESTATION

BACKGROUND

Field of the Invention

The invention relates generally to a method for managing a life-cycle of cryptographic keys, and more specifically, to a computer-implemented method for managing a life-cycle of at least partially interdependent cryptographic keys. The invention relates further to a distributed linked manifest system for managing a life-cycle of interdependent cryptographic keys, and a computer program product.

Related Art

The continued trend to protect soft-assets leads to an encryption of almost anything that is stored in electronic form, e.g., on a storage system like a spinning disk (HD=hard drive) or a solid-state (SSD) disk. Thereby, soft-assets may be anything that can be stored in electronic form. This may comprise software components—e.g., in source code form, an object form or in an executable form—digital images, artificial intelligence models, spreadsheets with data, text, voice and sound data, just to name a few.

In order to increase the level of protection of the data or soft-assets, the data may be protected by a cryptographic key. In other advanced systems, the cryptographic key may be changed from time to time. This may lead to problematic situations like the following: A new software component may be built from software sub-components which may each be protected by a cryptographic key. The same may be true for the newly built software component. In such a situation, a key roll—i.e., change of a key of the sub-component—caused by leakage or due to a security policy—may involve complicated and time-consuming efforts, especially, when organizational boundaries are exceeded. This may be the case, for example, if one of the sub-components may be obtained from a third party, e.g., an Open Source software pool or a third-party software developer, e.g., an ISV (independent software vendor).

In such a situation, it would be required that all keys of all dependent components—i.e., for which building, a sub-component was used—would also need a key-roll, i.e., a change of the respective cryptographic key.

A further complication may be in the fact that modern systems may have multiple "key and trust chains" so that their security proposition is built on top of the underlying cryptographic concept.

The currently known ideas used to tackle such a situation have the strong limitation that they are manual processes. This may, e.g., apply especially to procedures such as regularly updated "certificate revocation lists" on public webpages, which are mentioned in a certificate and may have to be queried in order to check whether a certificate is still valid. Furthermore, regular automatic key rolls based on dates or triggers may be established layer-wise in a key chain.

In this general technical concept, some publications have been made already: e.g., document U.S. Pub. No. 20190273611A1 describes a method for partially encrypting conversations using different cryptographic keys. Thereby, messages communicated during a conversation session may be encrypted using a cryptographic key. Other conversation participants may then decrypt the messages using the cryptographic key. During the conversation, an event may occur that causes a new cryptographic key to be generated. The conversation participants may then use the new cryptographic key when communicating. As such, previously-encrypted messages may be inaccessible to new members that do not have the old cryptographic key, while newly created messages may be inaccessible to former members that do not have the new cryptographic key. Hence, an isolated collection may store the messages and related cryptographic keys.

Furthermore, document U.S. Pat. No. 10,958,424 B1 describes a system, such as an extension service to receive a first public key that is derivable based at least in part on a secret that is shared between at least a first device and a second device. The system can derive a cryptographic key based at least in part on the first public key and transmit a second public key that enable another system to derive the cryptographic key.

However, such approaches do not solve the above-described problem. Therefore, there may be a need to manage cryptographic key dependencies based on dependent software components in an automatic and temper-approved way.

SUMMARY

According to one aspect of the present invention, a computer-implemented method for managing a life-cycle of at least partially interdependent cryptographic keys may be provided. Each of the cryptographic keys may be signed and relates to a different one of the artifacts. The method may comprise creating a key manifest, wherein the key manifest comprises data about determined dependencies of the cryptographic keys at a point in time when one of the artifacts is built, encrypting—in particular, and/or signing—the key manifest with a manifest key, and upon a life-cycle change happening to one out of the group comprising one of the artifacts and one of the interdependent cryptographic keys in the key manifest of the one of the artifacts, the method may comprise decrypting the key manifest, and invoking an action to a related one out of the group comprising the one of the artifacts and at least one of the interdependent cryptographic keys in accordance with the key manifest.

According to another aspect of the present invention, a distributed linked manifest system for managing a life-cycle of interdependent cryptographic keys may be provided. Each of the cryptographic keys may be signed and relates to a different one of the artifacts. The system comprises a processor and a memory, communicatively coupled to the processor, wherein the memory stores program code portions that, when executed, enable the processor, to create a key manifest, wherein the key manifest comprises data about determined dependencies of the cryptographic keys at a point in time when one of the artifacts is built and encrypt the key manifest with a manifest key. Upon a life-cycle change happening to one out of the group comprising one of the artifacts and one of the interdependent cryptographic keys in the key manifest of the one of the artifacts, the processor may also be enabled to decrypt the key manifest and invoke an action to a related one out of the group comprising the one of the artifacts and at least one of the interdependent cryptographic keys in accordance with the key manifest.

The proposed computer-implemented method for managing a life-cycle of at least in partially interdependent cryptographic keys may offer multiple advantages, technical effects, contributions and/or improvements:

The key manifest may be a signed metadata artifact which may describe or comprise the encryption keys, sources and secrets used for a given artifact, e.g., a piece of software but also any other protectable item (e.g., training data for an AI system, a partial-image for a composition of a lager image, a paragraph of a larger article, . . . ). The idea here may be to have each sub-key manifest or key chain signed by a step owner, and all parties accessing the artifact, as well as an end-user or a process representing the end-user's action may have to access to the key manifest.

The key manifest may represent the validated source to obtain the corresponding information of the artifact, as well as a proof for the fact that the key chain is still trustworthy. Thereby, the key manifest is used to trigger any build(ing) or modifying activities to the artifact, in the sense of a "previous" step of the lifecycle of the artifact has provided a manifest (i.e., due to a build or modification activity) and a subsequent step may use this to trigger a build step or a modification (i.e., rolling dependent keys, rebuild of the artifact, etc.) for the step being responsible for. Therefore, given that all components are completely validated, i.e., a hash value, any change of a previous or subsequent artifact or key manifest may lead to a different new hash and a different/changed key manifest. Most likely, not with respect to the components listed but the UUIDs, identifiers, hashes within the key manifest.

As a consequence, if a software platform vendor would change an encryption key to a basic software component, an ISV (independent software vendor using the basic software components for its own solution) would automatically react and change its key as well. Furthermore, a build step for a software component, i.e., an artifact—would incorporate the validation of the key chain, whenever it includes a secret or depends on its secret.

Additionally, the proposed method would allow a complete "watertight" and uncompromisable chain of security measures, wherein an owner or cause of each change to the artifact would in parallel also adapt the key chain, i.e. the key manifest. Thus, it may always be auditable what kind of build history an executable software artifact has. This characteristic may be helpful to guarantee a trustful execution of interrelated cloud computing services in large and complex heterogeneous cloud computing environments—but not only there. Any key-chain change would be reflected 'downstream' using the key manifest. The key change may be trigged by any event, e.g., a time-based key-roll or a compromising of a key or some other event.

Last but not least, it should also be mentioned that the key manifest may also be used advantageously during deployment steps of artifact—e.g., in the form of executable code—and may thus be used as an attestation for the deployment of an "allowed" or trustworthy workload.

In the following, additional embodiments of the inventive concept—applicable for the method as well as for the system—will be described.

According to one advantageous embodiment of the method, the artifact may be encrypted. I.e., it may not only be signed but also protected by a cryptographic key. Hence, for a decryption a key may be required which may be generated as follows: if a key manifest of level n+1 may have the secret then a public key may be used from the key manifest of level n, against which it encrypts the key manifest it generates in level n. Given that level n+1 has the secret it is capable to decrypt the key manifest.

Alternatively, if the key manifest of level n may have the secret with which may have been signed, it may pass the public key together with the key manifest or through another trusted communication channel over to level n+1. In level n+1 such public key may be used for a validation whether the data originate from the expected source (here: level n). In combination of the above level n and level n+1 may perform a trustworthy key exchange. Based on such process, the key manifests of the levels n and n+1 may determine—via a key derivation—a common secret which may then be used by both sides. Both levels exchange their public keys and the key artifact may then be encrypted by the common secret. As a further useful consequence, the proposed concept of key manifests may also be used in the context of the known Diffie-Hellman key exchanges.

According to an interesting embodiment of the method, wherein the manifest key may encrypt only a part of the key manifest. This way, the key manifest may exemplary be a readable JSON data structure with the encrypted part and a signature and some other metadata relating to the artifact.

According to a permissive embodiment of the method, the actions may comprise creating a new key. This may be a useful feature if the life-cycle change is, e.g., a deployment or an instantiation of the software artifact. In this case, a new key may be generated as it is also illustrated in the figures.

According to another permissive embodiment of the method, the action to the artifact is a building or modifying the artifact (i.e., a build process) or a deployment of the artifact. This way, not only user driven modifications (e.g., editing) are reflected but also machine/system-driven modification may lead to key manifest updates.

According to a preferred embodiment of the method, the action to the at least one of the interdependent cryptographic keys may be a change of one of the interdependent cryptographic keys. This may be seen as a logical consequence of the construction of the key manifest. If a key-roll may happen to a keychain member, this may have the effect that also 'downstream' keys may have to be changed in case of a direct or indirect dependency on the related artifacts and therefore also a direct or indirect dependency of the related keys of the artifacts. There may be several event triggers to this, such as any kind of alert, a regular key policy check, or a regular, e.g., time-based key-roll.

According to an advantageous embodiment of the method, the life-cycle change may be an expiration or revocation of at least one of the dependent cryptographic keys or the key manifest. Hence, any change in the integrity of the key chain may be interpreted as a live-cycle change which may lead consequently to a change of the interdependent keys in the respective key manifest.

According to a further developed embodiment of the method, the action to the at least one interdependent cryptographic keys may comprise an encryption or decryption of data—e.g., data provided with a relation to the artifact—wherein the resulting key manifest comprises a reference to the data. This may, e.g., be the case, if the artifact may be interpreted as a pointer to the data.

According to another preferred embodiment of the method, the key manifest may be a combination of a plurality—i.e., at least two—of key manifests. An example for this is given in the figures in case the assumed build process in which at least two artifacts are combined to build a new, larger artifact.

According to an embodiment of the method, the key manifest may comprise a certificate which was used to validate dependent key manifests. This may also show that more than only one encryption or decryption keys may be part of the key manifest. Also, other relevant security-related data may be incorporated in the key manifest. They may also undergo the same or comparable actions as the interdependent keys of the related artifact.

According to a further developed embodiment of the method, each of the interdependent cryptographic keys may be a login credential, an API (application programming interface) token, or a hardware security module protected key. However, the list of potential meanings of the components of the key manifest may not end here. A security relevant component may be used as part of the key manifest. With the option including API tokens in the key manifest, interfaces between software components, i.e., services may have related key manifests.

Furthermore, embodiments may take the form of a related computer program product, accessible from a computer-usable or computer-readable medium providing program code for use, by, or in connection, with a computer or any instruction execution system. For the purpose of this description, a computer-usable or computer-readable medium may be any apparatus that may contain means for storing, communicating, propagating or transporting the program for use, by, or in connection, with the instruction execution system, apparatus, or device.

BRIEF DESCRIPTION OF THE DRAWINGS

It should be noted that embodiments of the invention are described with reference to different subject-matters. In particular, some embodiments are described with reference to method type claims, whereas other embodiments are described with reference to apparatus type claims. However, a person skilled in the art will gather from the above and the following description that, unless otherwise notified, in addition to any combination of features belonging to one type of subject-matter, also any combination between features relating to different subject-matters, in particular, between features of the method type claims, and features of the apparatus type claims, is considered as to be disclosed within this document.

The aspects defined above and further aspects of the present invention are apparent from the examples of embodiments to be described hereinafter and are explained with reference to the examples of embodiments, to which the invention is not limited.

Figure 1:
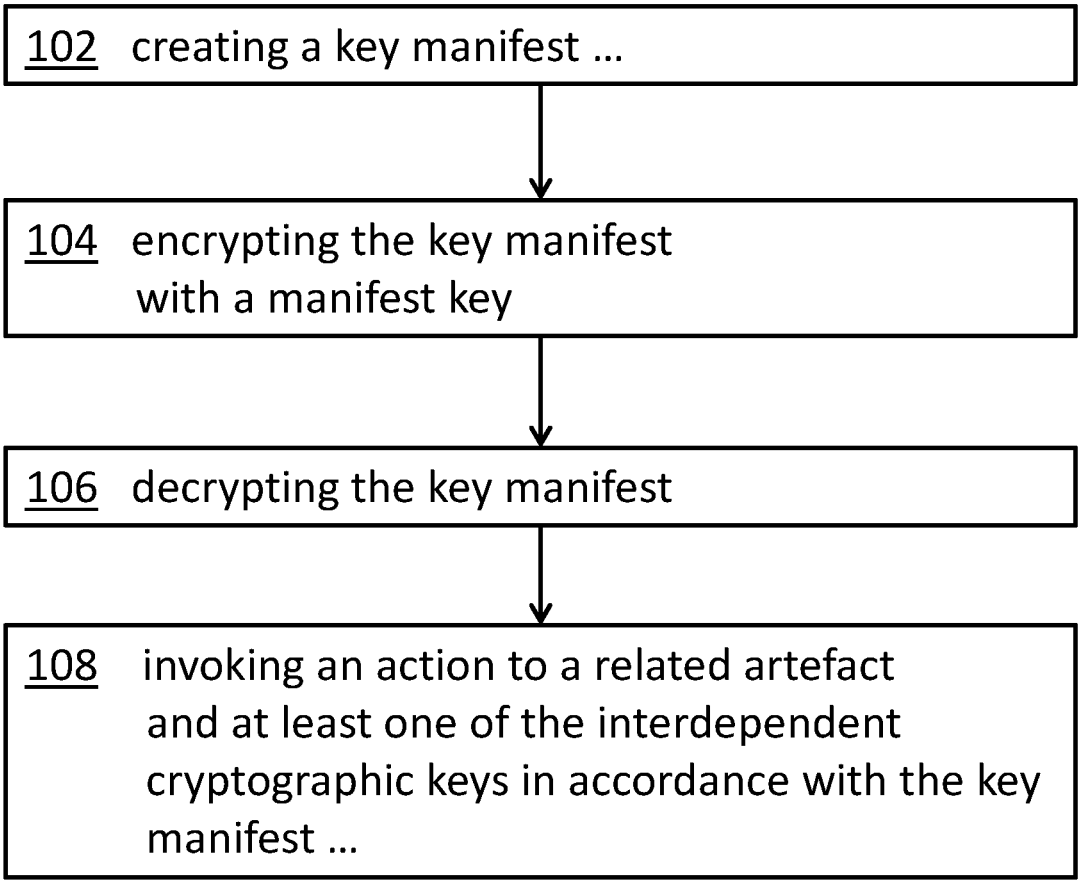

Preferred embodiments of the invention will be described, by way of example only, and with reference to the following drawings:

FIG. 1 shows a block diagram of an embodiment of the inventive computer-implemented method for managing a life-cycle of at least partially interdependent cryptographic keys.

Figure 2:
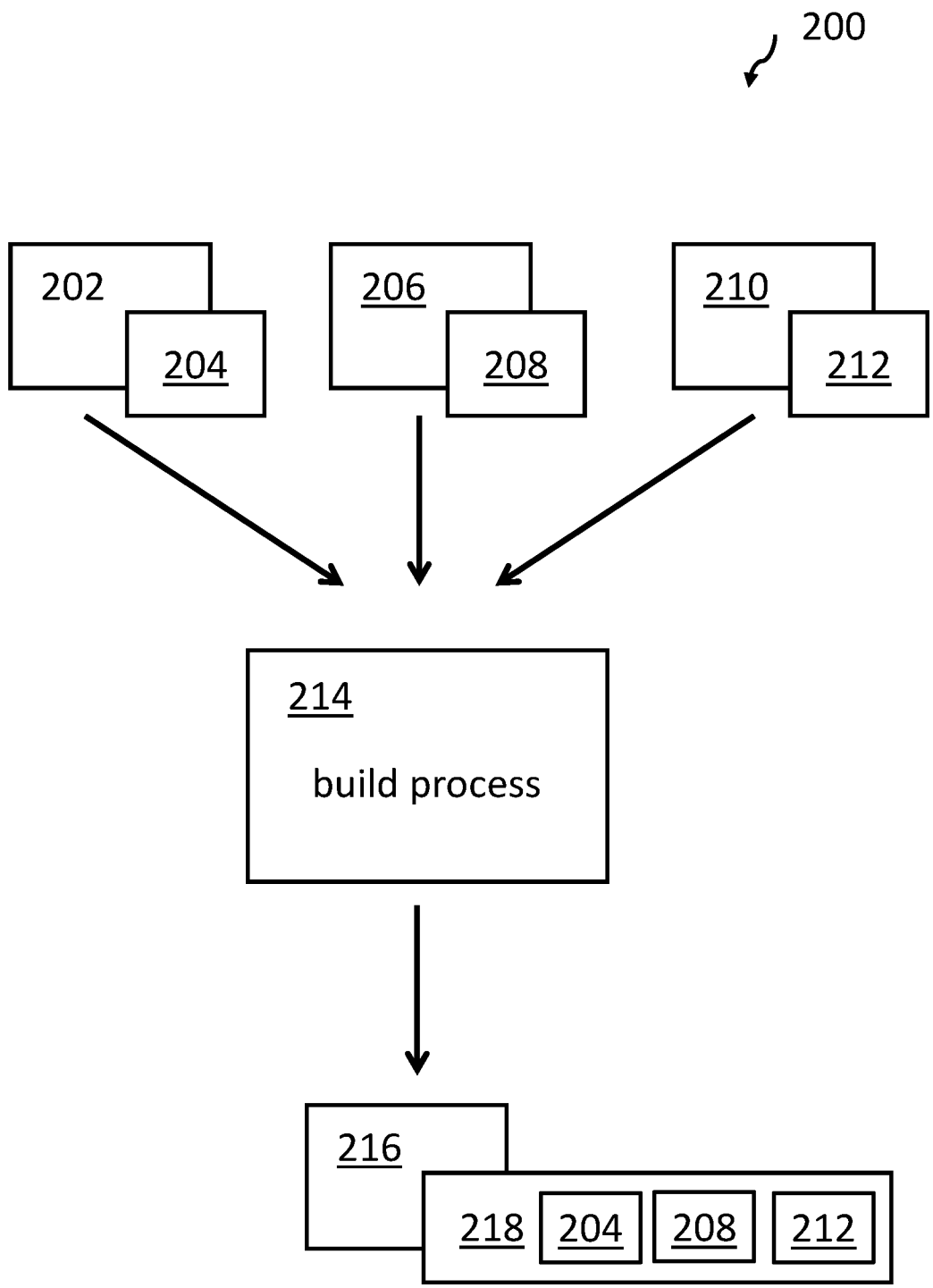

FIG. 2 shows a block diagram of how key manifests can be integrated.

Figure 3:
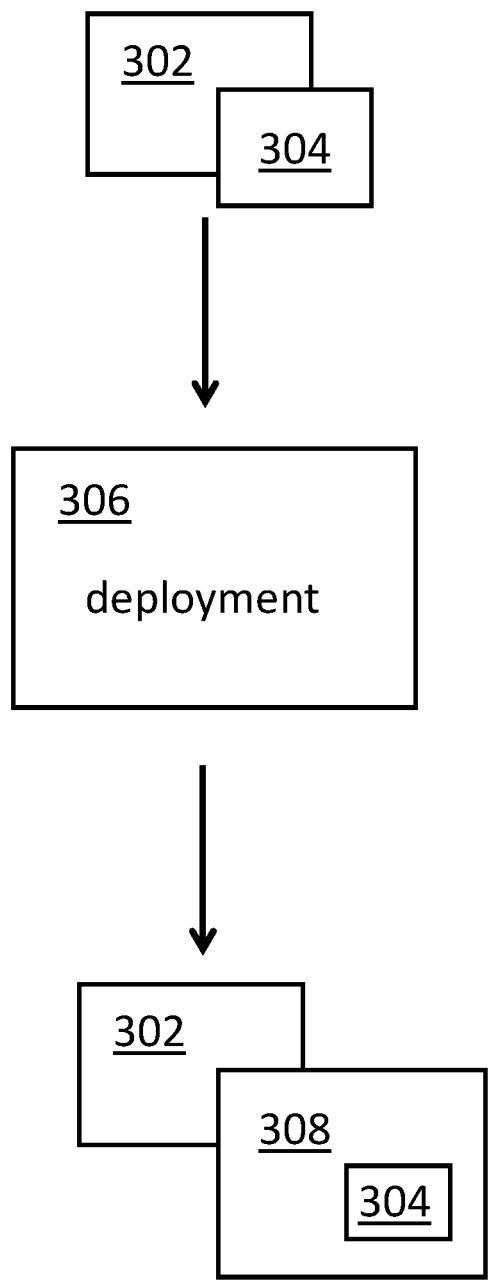

FIG. 3 shows a block diagram of a life-time event happening and how the proposed system reacts.

Figure 4:
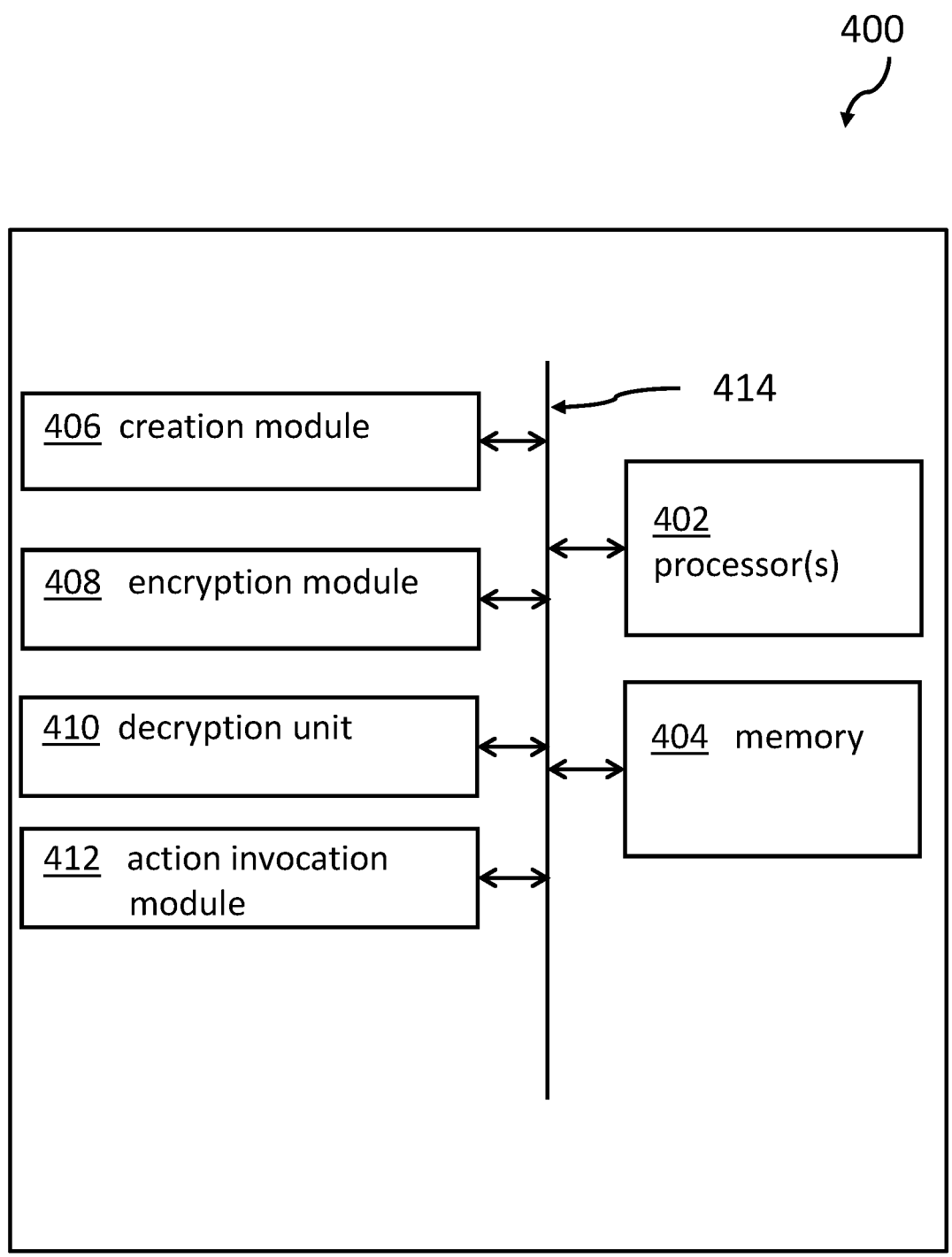

FIG. 4 shows a block diagram of an embodiment of the inventive distributed linked manifest system for managing a life-cycle of interdependent cryptographic keys.

Figure 5:
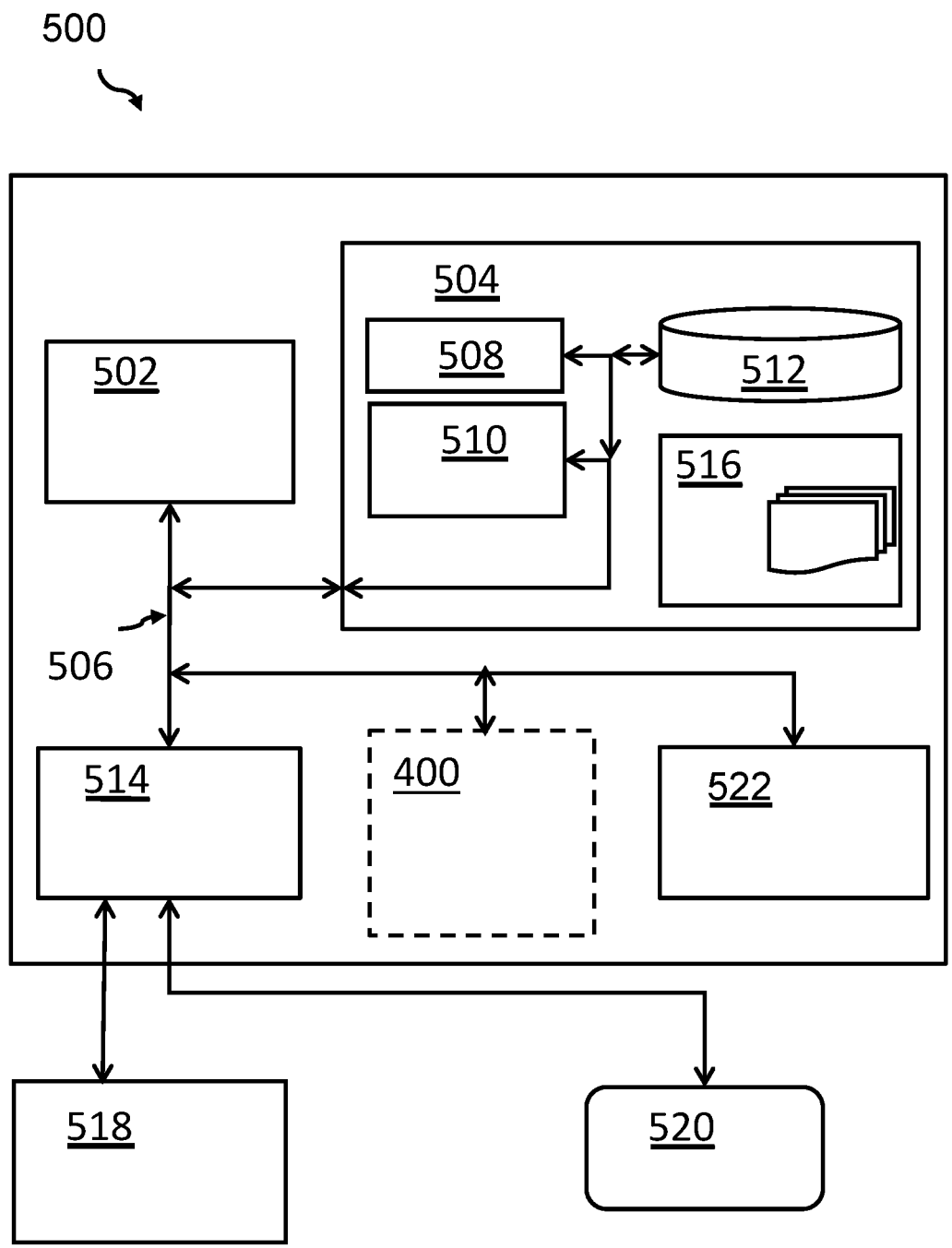

FIG. 5 shows an embodiment of a computing system comprising the system according to FIG. 4.

Figure 6:
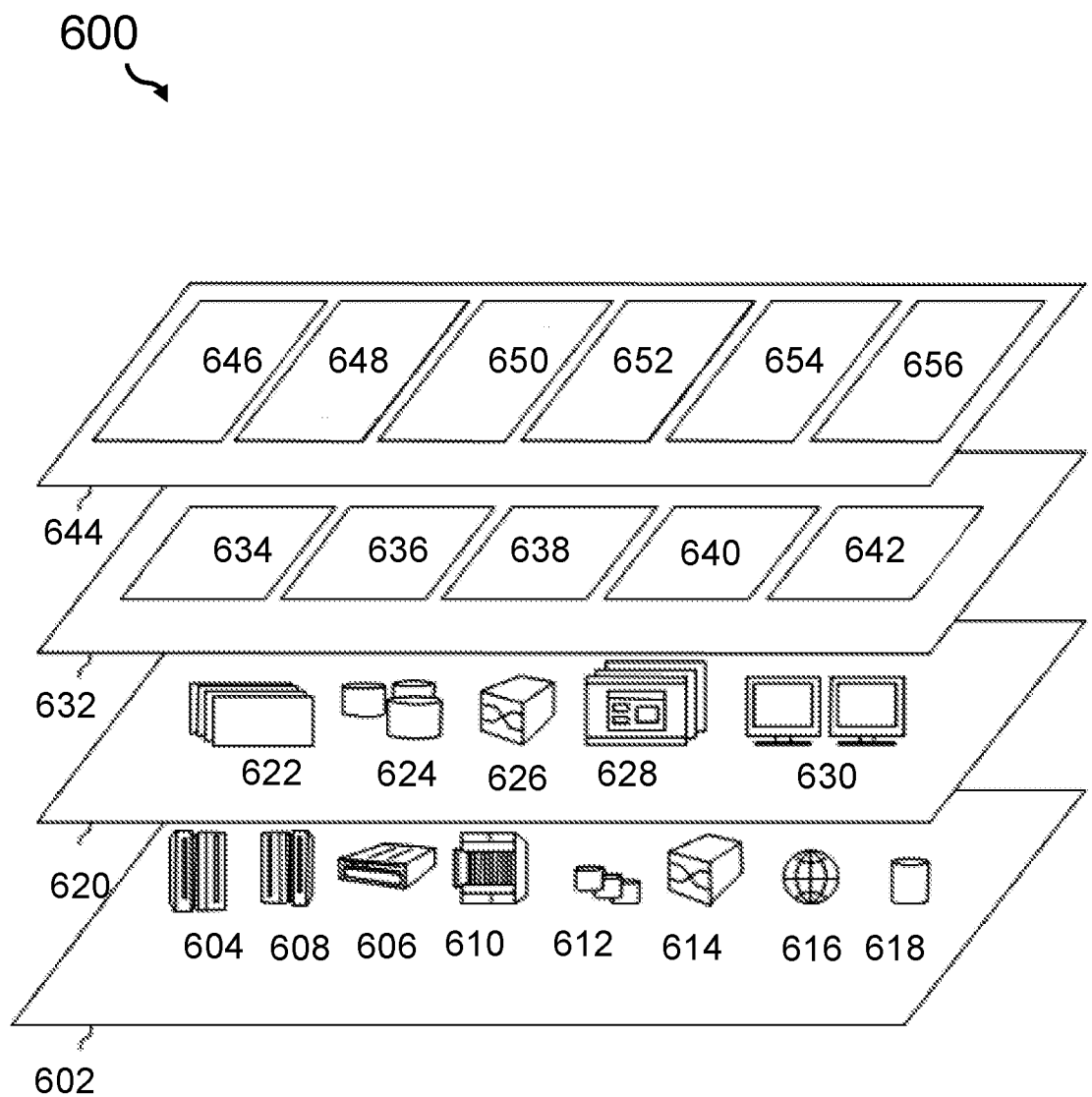

FIG. 6 shows a cloud computing environment in which at least parts of the inventive concept may be deployed.

Figure 7:
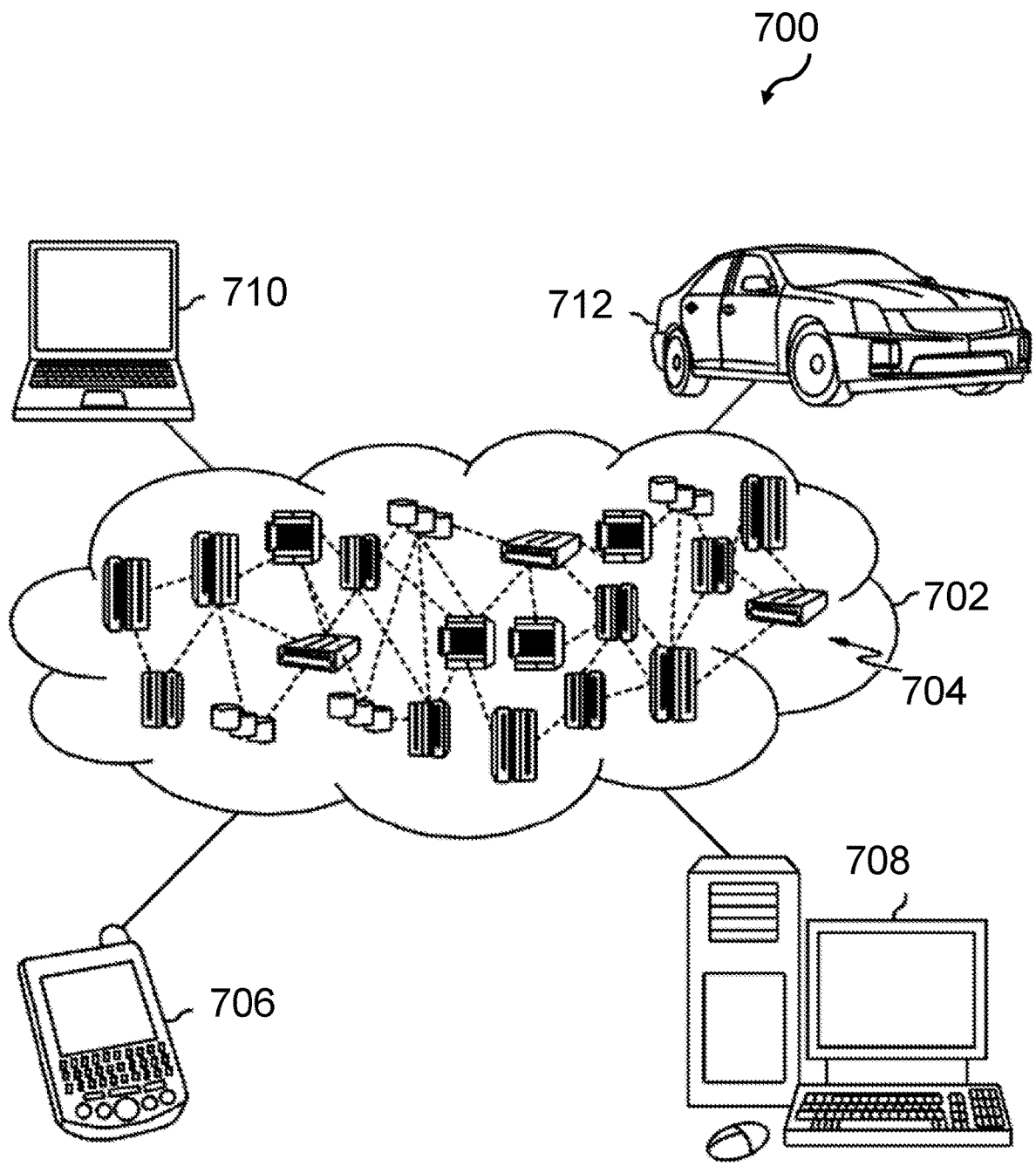

FIG. 7 shows components of a cloud computing environment.

DETAILED DESCRIPTION

In the context of this description, the following conventions, terms and/or expressions may be used:

The term 'interdependent cryptographic keys' may denote a group of encryption/decryption/signing keys used to protect artifacts—e.g., software components—which relate to one another in parallel to the relationship of the artifacts to which the cryptographic keys relate.

The term 'signed' may denote in computer science a mathematical scheme for verifying the authenticity of digital messages or documents, or, in general any data. A valid digital signature, where the prerequisites are satisfied, gives a recipient very strong reason to believe that the data were created by a known sender (i.e., authentication), and that the data were not altered in transit (i.e., proving integrity). Digital signatures are a standard element of most cryptographic protocol suites, and are commonly used for software distribution, financial transactions, contract management software and in other cases where it is important to detect forgery or tampering.

The term 'artifact' may denote any data or data item in a computer system which may be signed or cryptographically protected. One example may be a piece of software code, training data for an AI system, a portion of a document or any other data relating to the function of the computer system or to user generated data. Other examples for artifacts may comprise any software components—e.g., in source code form, in object form, in archived form or in executable form—digital images, artificial intelligence models, spreadsheets with data, text, voice and sound data or a mathematically derived digital finder-print of such data or artifact.

The term 'key manifest' may denote data or a container for data, in particular, cryptographic keys relating to inter-related artifacts. However, a key manifest may also comprise signatures for at least parts of the artifacts and components of symmetric key pairs. In this sense, a key manifest may describe a special sort of metadata for the artifact or digital finder-print.

The term 'life-cycle change' may denote any event having an influence on a life-cycle of an artifact, like a build process, a deployment step, a modification and similar. Basically, the life-cycle change may relate to any measurable and recordable status change of the artifact.

The term 'action' may denote any change or modification to an artifact or the related key manifest, e.g., at a given point in time, e.g., due to a predefined expiration or time window.

The term 'cloud computing'—and equivalently the more specific term 'cloud service environment'—may in this context be interpreted as a model for enabling convenient, on-demand network access to a shared pool of configurable computing resources (e.g., networks, servers, storage, applications, and services) that can be rapidly provisioned and released with minimal management effort or service provider interaction. This cloud model promotes availability and is composed of at least five essential characteristics, three service models and four deployment models.

Essential characteristics of cloud computing comprise:
On-demand self-service: A consumer can unilaterally provision computing capabilities, such as server time and network storage, when needed automatically without requiring human interaction with each service provider.
Broad network access: Capabilities are available over the network and accessed through standard mechanisms that promote use by heterogeneous thin or thick client platforms (e.g., mobile phones, laptops, and PDAs).
Resource pooling: The provider's computing resources are pooled to serve multiple consumers using a multi-tenant model with different physical and virtual resources, dynamically assigned and reassigned according to consumer demand. There is a sense of location independence in that the customer generally has no control or knowledge over the exact location of the provided resources, but may be able to specify location at a higher level of abstraction (e.g., country, state, or datacenter). Examples of resources include storage, processing, memory, network bandwidth and virtual machines.

Rapid elasticity: Capabilities can be rapidly and elastically provisioned, in some cases automatically, to quickly scale out and rapidly release to quickly scale in. To the consumer, the capabilities available for provisioning often appear to be unlimited and can be purchased in any quantity at any time.

Measured Service: Cloud systems automatically control and optimize resource used by leveraging a metering capability at some level of abstraction appropriate to the type of service (e.g., storage, processing, bandwidth, and active user accounts). Resource usage can be monitored, controlled and reported providing transparency for both, the provider and consumer of the utilized service.

Service models for cloud computing use comprise:

Cloud Software as a Service (SaaS): The capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Cloud Platform as a Service (PaaS): The capability provided to the consumer is to deploy onto the cloud infrastructure consumer-created or acquired applications created using programming languages and tools supported by the provider. The consumer does not manage or control the underlying cloud infrastructure including network, servers, operating systems, or storage, but has control over the deployed applications and possibly application hosting environment configurations.

Cloud Infrastructure as a Service (IaaS): The capability provided to the consumer is to provision processing, storage, networks, and other fundamental computing resources where the consumer is able to deploy and run arbitrary software, which can include operating systems and applications. The consumer does not manage or control the underlying cloud infrastructure, but has control over operating systems, storage, deployed applications, and possibly limited control of selected networking components (e.g., host firewalls).

Deployment models for cloud computing comprise:

Private cloud: The cloud infrastructure is operated solely by an organization. It may be managed by the organization or a third party and may exist on premise or off premise.

Community cloud: The cloud infrastructure is shared by several organizations and supports a specific community that has shared concerns (e.g., mission, security requirements, policy, and compliance considerations). It may be managed by the organizations or a third party and may exist on premise or off premise.

Public cloud: The cloud infrastructure is made available to the general public or a large industry group and is owned by an organization selling cloud services.

Hybrid cloud: The cloud infrastructure is a composition of two or more clouds (private, community, or public) that remain unique entities but are bound together by standardized or proprietary technology that enables data and application portability (e.g., cloud bursting for load-balancing between clouds).

It may be noted that cloud software takes full advantage of the cloud paradigm by being service-oriented with a focus on statelessness (with exceptions), low coupling, modularity, and semantic interoperability.

In the following, a detailed description of the figures will be given. All instructions in the figures are schematic. Firstly, a block diagram of an embodiment of the inventive computer-implemented method for managing a life-cycle of at least partially interdependent cryptographic keys is given. Afterwards, further embodiments, as well as embodiments of the distributed linked manifest system for managing a life-cycle of interdependent cryptographic keys will be described.

FIG. 1 shows a block diagram of a preferred embodiment of the computer-implemented method 100 for managing a life-cycle of at least partially interdependent cryptographic keys. Each of the cryptographic keys is signed and relates to a different one of artifacts. These may be software components or software artifacts or keys that are hosted in a hardware security module; the cryptographic keys are dependent on one another in a 'vertical' relationship. The cryptographic keys may also be dependent on another in a 'horizontal' relationship. The cryptographic keys may also be dependent on another in a 'horizontal' and 'vertical' relationship. The method 100 comprises creating, 102, a key manifest, wherein the key manifest comprises data about determined dependencies, in particular one or more, of the cryptographic keys at a point in time when one of the artifacts is built (e.g., a BUILD or also a DEPLOY step). In this sense, the key manifest are metadata to the artifact.

The method 100 also comprises encrypting, 104, the key manifest with a manifest key. This should be at least signed if not always encrypted. Upon a life-cycle change happening to one out of the group comprising one of the artifacts and one of the interdependent cryptographic keys in the key manifest of the one of the artifacts, the method comprises decrypting, 106, the key manifest, and invoking, 108, an action—in particular, at least one—to a related one out of the group comprising the one of the artifacts and at least one of the interdependent cryptographic keys in accordance with the key manifest.

FIG. 2 shows a block diagram 200 of how key manifests can be integrated. The artifacts 202, 206, 210 have each a related key manifest 204, 208, 212. They can also be seen as a key chain because the artifacts can also be constructed from different components which can each be protected by an individual key. To make it easier to understand, artifacts can be thought of as software components that are supposed to build a new software functionality. This is shown by the build block 214 which shall represent the software build process. The result of the build process is the new software component 216—e.g., a complete service or application or a pre-product thereof—i.e., the new artifact 216. The related key manifest 218 now comprises the key chains or key manifests 204, 208 and 212 of the source or original software components 202, 206, 210.

It should be comprehendible that if a protection key of one of the artifacts 202, 206, 210 undergoes a key-roll or an otherwise initiated key change, also key manifest 218, or better the portion or partial key manifests 204, 208, 212 that relate to the artifacts which key has been changed, has to be changed as well in order to keep the key chain intact.

FIG. 3 shows a block diagram 300 of a life-time event happening and how the proposed system (or methods)

reacts. The life-cycle event is here exemplary shown as a deployment 306 of the software component 302 with its related key manifest 304. Hence, the instantiated or deployed or executed software component 302—e.g., a service or an application—gets a changed key manifest 308, e.g., a new key manifest including the "old" key manifest 304.

FIG. 4 shows a block diagram of an embodiment of the distributed linked manifest system 400 for managing a life-cycle of interdependent cryptographic keys. Each of the cryptographic keys is signed and relates to a different artifact. The system comprises a processor 402 and a memory 404, communicatively coupled to the processor 402, wherein the memory 404 stores program code portions that, when executed, enable the processor 402, to create, in particular by a creation module 406, a key manifest, wherein the key manifest comprises data about determined dependencies of the cryptographic keys at a point in time when one of the artifacts is built. The processor is further enabled to encrypt, in particular, by an encryption unit 408, the key manifest with a manifest key.

Upon a life-cycle change happening to one out of the group comprising one of the artifacts and one of the interdependent cryptographic keys in the key manifest of the one of the artifacts, the processor—or in an alternative embodiment—a hardware security module (HSM) is also enabled to decrypt—in particular, by a decryption unit 410—the key manifest, and to invoke—in particular, using an action invocation module 412—an action to a related one out of the group comprising the one of the artifacts and at least one of the interdependent cryptographic keys in accordance with the key manifest. Here, a manifest key exchange module (not shown in FIG. 4) may be instrumental.

It is shall also be mentioned that all functional units, modules and functional blocks, in particular, the processor 402, the memory 404, the creation module 406, the encryption unit 408, the decryption unit 410, and the invocation module 412, may be communicatively coupled to each other for signal or message exchange in a selected 1:1 manner. Alternatively the functional units, modules and functional blocks can be linked to a system internal bus system 414 for a selective signal or message exchange. It shall also be mentioned that the encryption unit 408 and the decryption unit 410 may be combined into one joint encryption/decryption unit, e.g., Hardware Security Module. It shall also be mentioned that a distributed linked manifest system 400 may be communicatively coupled to another instance of a distributed linked manifest system 400 as a whole or in parts for signal or message exchange in a selected 1:1 manner.

Embodiments of the invention may be implemented together with virtually any type of computer, regardless of the platform being suitable for storing and/or executing program code. FIG. 5 shows, as an example, a computing system 700 suitable for executing program code related to the proposed method.

The computing system 500 is only one example of a suitable computer system, and is not intended to suggest any limitation as to the scope of use or functionality of embodiments of the invention described herein, regardless, whether the computer system 500 is capable of being implemented and/or performing any of the functionality set forth hereinabove. In the computer system 500, there are components, which are operational with numerous other general purpose or special purpose computing system environments or configurations. Examples of well-known computing systems, environments, and/or configurations that may be suitable for use with computer system/server 500 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like. Computer system/server 500 may be described in the general context of computer system-executable instructions, such as program modules, being executed by a computer system 500. Generally, program modules may include routines, programs, objects, components, logic, data structures, and so on that perform particular tasks or implement particular abstract data types. Computer system/server 500 may be practiced in distributed cloud computing environments where tasks are performed by remote processing devices that are linked through a communications network. In a distributed cloud computing environment, program modules may be located in both, local and remote computer system storage media, including memory storage devices.

As shown in the figure, computer system/server 500 is shown in the form of a general-purpose computing device. The components of computer system/server 500 may include, but are not limited to, one or more processors or processing units 502, a system memory 504, and a bus 506 that couple various system components including system memory 504 to the processor 502. Bus 506 represents one or more of any of several types of bus structures, including a memory bus or memory controller, a peripheral bus, an accelerated graphics port, and a processor or local bus using any of a variety of bus architectures. By way of example, and not limiting, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Computer system/server 500 typically includes a variety of computer system readable media. Such media may be any available media that is accessible by computer system/server 500, and it includes both, volatile and non-volatile media, removable and non-removable media.

The system memory 504 may include computer system readable media in the form of volatile memory, such as random-access memory (RAM) 508 and/or cache memory 510. Computer system/server 500 may further include other removable/non-removable, volatile/non-volatile computer system storage media. By way of example only, a storage system 512 may be provided for reading from and writing to a non-removable, non-volatile magnetic media (not shown and typically called a 'hard drive'). Although not shown, a magnetic disk drive for reading from and writing to a removable, non-volatile magnetic disk (e.g., a 'floppy disk'), and an optical disk drive for reading from or writing to a removable, non-volatile optical disk such as a CD-ROM, DVD-ROM or other optical media may be provided. In such instances, each can be connected to bus 506 by one or more data media interfaces. As will be further depicted and described below, memory 504 may include at least one program product having a set (e.g., at least one) of program modules that are configured to carry out the functions of embodiments of the invention.

The program/utility, having a set (at least one) of program modules 516, may be stored in memory 504 by way of example, and not limiting, as well as an operating system, one or more application programs, other program modules, and program data. Each of the operating systems, one or more application programs, other program modules, and program data or some combination thereof, may include an implementation of a networking environment. Program modules 516 generally carry out the functions and/or methodologies of embodiments of the invention, as described herein.

The computer system/server 500 may also communicate with one or more external devices 518 such as a keyboard, a pointing device, a display 520, etc.; one or more devices that enable a user to interact with computer system/server 500; and/or any devices (e.g., network card, modem, etc.) that enable computer system/server 500 to communicate with one or more other computing devices. Such communication can occur via Input/Output (I/O) interfaces 514. Still yet, computer system/server 500 may communicate with one or more networks such as a local area network (LAN), a general wide area network (WAN), and/or a public network (e.g., the Internet) via network adapter 522. As depicted, network adapter 522 may communicate with the other components of the computer system/server 500 via bus 506. It should be understood that, although not shown, other hardware and/or software components could be used in conjunction with computer system/server 500. Examples, include, but are not limited to: microcode, device drivers, redundant processing units, external disk drive arrays, RAID systems, tape drives, and data archival storage systems, etc.

Additionally, the distributed linked manifest system 400 for managing a life-cycle of interdependent cryptographic keys may be attached to the bus system 506.

FIG. 6 shows a cloud computing environment 600 in which at least parts of the inventive concept may be deployed. A set of functional abstraction layers provided by a cloud computing environment is shown. It should be understood in advance that the components, layers, and functions, shown in FIG. 6, are intended to be illustrative only, and embodiments of the invention are not limited thereto. As depicted, the following layers and corresponding functions are provided: Hardware and software layer 602 include hardware and software components. Examples of hardware components include: mainframes 604; servers 606; RISC (Reduced Instruction Set Computer) architecture based servers 608; blade servers 610; storage devices 612; networks 614 and networking components 614. In some embodiments, software components include network application server software 616 and/or database software 618.

Virtualization layer 620 provides an abstraction layer from which the following examples of virtual entities may be provided: virtual servers 622; virtual storage 624; virtual networks 626, including virtual private networks; virtual applications and operating systems 628; and virtual clients 630. In one example, management layer 632 may provide the functions described below. Resource provisioning 634 provides dynamic procurement of computing resources and other resources that are utilized to perform tasks within the cloud computing environment. Metering and pricing 636 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 638 provides access to the cloud computing environment for consumers and system administrators. Service level management 640 provides cloud computing resource allocation and management such that required service levels are met. Service Level Agreement (SLA) planning and fulfillment 642 provides pre-arrangement for, and procurement of, cloud computing resources for which a future requirement is anticipated in accordance with an SLA.

Workload layer 644 provides examples of functionality for which the cloud computing environment may be utilized. Examples of workloads and functions which may be provided from this layer include: mapping and navigation 646; software development and lifecycle management 648; virtual classroom education delivery 650; data analytics processing 652; transaction processing 654; and other endpoint services or systems 656 like the distributed linked manifest system (compare also FIG. 4, 400).

FIG. 7 shows components 700 of a cloud computing environment 702. As shown, cloud computing environment 702 comprises one or more cloud computing nodes 704 with which local computing devices used by cloud consumers, such as, for example, personal digital assistant (PDA) or cellular telephone 706, desktop computer 708, laptop computer 710, and/or automobile computer system 712 may communicate. Nodes 704 may communicate with one another. They may be grouped (not shown) physically or virtually, in one or more networks, such as Private, Community, Public, or Hybrid clouds as described hereinabove, or a combination thereof. This allows cloud computing environment 702 to offer infrastructure, platforms and/or software as services for which a cloud consumer does not need to maintain resources on a local computing device. It is understood that the types of computing devices 704 shown in FIG. 7 are intended to be illustrative only and that computing nodes 10 and cloud computing environment 702 can communicate with any type of computerized device over any type of network and/or network addressable connection (e.g., using a web browser).

The descriptions of the various embodiments of the present invention have been presented for purposes of illustration, but are not intended to be exhaustive or limited to the embodiments disclosed. Many modifications and variations will be apparent to those of ordinary skills in the art without departing from the scope and spirit of the described embodiments. The terminology used herein was chosen to best explain the principles of the embodiments, the practical application or technical improvement over technologies found in the marketplace, or to enable others of ordinary skills in the art to understand the embodiments disclosed herein.

The present invention may be embodied as a system, a method, and/or a computer program product. The computer program product may include a computer-readable storage medium (or media) having computer readable program instructions thereon for causing a processor to carry out aspects of the present invention.

The computer-readable storage medium may be an electronic, magnetic, optical, electromagnetic, infrared or a semi-conductor system for a propagation medium. Examples of a computer-readable medium may include a semi-conductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W), DVD and Blu-Ray-Disk.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disk read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer-readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Smalltalk, C++ or the like, and conventional procedural programming languages, such as the "C" programming language or similar programming languages. The computer readable program instructions may execute entirely on the user's computer, partly on the user's computer as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatuses, or another device to cause a series of operational steps to be performed on the computer, other programmable apparatus or other device to produce a computer implemented process, such that the instructions which execute on the computer, other programmable apparatuses, or another device implement the functions/acts specified in the flowchart and/or block diagram block or blocks.

The flowcharts and/or block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or act or carry out combinations of special purpose hardware and computer instructions.

The terminology used herein is for the purpose of describing particular embodiments only and is not intended to limit the invention. As used herein, the singular forms a, an, and the are intended to include the plural forms as well, unless the context clearly indicates otherwise. It will further be understood that the terms comprises and/or comprising, when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or steps plus function elements in the claims below are intended to include any structure, material, or act for performing the function in combination with other claimed elements, as specifically claimed. The description of the present invention has been presented for purposes of illustration and description, but is not intended to be exhaustive or limited to the invention in the form disclosed. Many modifications and variations will be apparent to those of ordinary skills in the art without departing from the scope and spirit of the invention. The embodiments are chosen and described in order to best explain the principles of the invention and the practical application, and to enable others of ordinary skills in the art to understand the invention for various embodiments with various modifications, as are suited to the particular use contemplated.

In a nutshell, the inventive concept may be summarized by the following clauses:

1. A computer-implemented method for managing a life-cycle of at least in parts interdependent cryptographic keys, wherein each of the cryptographic keys is signed and relates to a different one of artifacts, the method comprising
    creating a key manifest, wherein the key manifest comprises data about determined dependencies of the cryptographic keys at a point in time when one of the artifacts is built
    encrypting the key manifest with a manifest key, and
    upon a life-cycle change happening to one out of the group comprising one of the artifacts and one of the interdependent cryptographic keys in the key manifest of the one of the artifacts,
        decrypting the key manifest, and
        invoking an action to a related one out of the group comprising the one of the artifacts and at least one of the interdependent cryptographic keys in accordance with the key manifest.

2. The method according to clause 1, wherein the artifact is encrypted.

3. The method according to clause 1 or 2, wherein the manifest key encrypts only a part of the key manifest.

4. The method according to any of the preceding clauses, wherein the actions comprise
    creating a new key.

5. The method according to any of the preceding clauses, wherein the action to the artifact is a building or modifying the artifact or a deployment of the artifact.

6. The method according to any of the preceding clauses, wherein the action to the at least one of the interdependent cryptographic keys is a change of one of the interdependent cryptographic keys.

7. The method according to any of the preceding clauses, wherein the life-cycle change is an expiration or revocation of a one of the dependent cryptographic keys or the key manifest.

8. The method according to any of the preceding clauses, wherein the action to the at least one interdependent cryptographic keys comprises an encryption or decryption of data, wherein the resulting key manifest comprises a reference to the data.

9. The method according to any of the preceding clauses, wherein the key manifest is a combination of a plurality of key manifests.

10. The method according to clause 9, wherein the key manifest comprises a certificate which was used to validate dependent key manifests.

11. The method according to any of the preceding clauses, wherein each of the interdependent cryptographic keys is one selected out of the group comprising a login credential, an API token, and a hardware security module protected key.

12. A distributed linked manifest system for managing a life-cycle of interdependent cryptographic keys, wherein each of the cryptographic keys is signed and relates to a different one of artifacts, the system comprising a processor and a memory, communicatively coupled to the processor, wherein the memory stores program code portions that, when executed, enable the processor, to
create a key manifest, wherein the key manifest comprises data about determined dependencies of the cryptographic keys at a point in time when one of the artifacts is built,
encrypt the key manifest with a manifest key, and
upon a life-cycle change happening to one out of the group comprising one of the artifacts and one of the interdependent cryptographic keys in the key manifest of the one of the artifacts,
    decrypt the key manifest, and
    invoke an action to a related one out of the group comprising the one of the artifacts and at least one of the interdependent cryptographic keys in accordance with the key manifest.

13. The system according to clause 12, wherein the artifact is encrypted.

14. The system according to clause 12 or 13, wherein the manifest key encrypts only a part of the key manifest.

15. The system according to any of the clauses 12 to 14, wherein the actions comprise
    creating a new key.

16. The system according to any of the clauses 12 to 15, wherein the action to the artifact is a building or modifying the artifact or a deployment of the artifact.

17. The system according to any of the clauses 12 to 16, wherein the action to the at least one of the interdependent cryptographic keys is a change of one of the interdependent cryptographic keys.

18. The system according to any of the clauses 12 to 17, wherein the life-cycle change is an expiration or revocation of a one of the dependent cryptographic keys or the key manifest.

19. The system according to any of the clauses 12 to 18, wherein the action to the at least one interdependent cryptographic keys comprises an encryption or decryption of data, wherein the resulting key manifest comprises a reference to the data.

20. A computer program product for managing a life-cycle of interdependent cryptographic keys, wherein each of the cryptographic keys is signed and relates to a different one of artifacts, the computer program product comprising a computer readable storage medium having program instructions embodied therewith, the program instructions being executable by one or more computing systems or controllers to cause the one or more computing systems to
create a key manifest, wherein the key manifest comprises data about determined dependencies of the cryptographic keys at a point in time when one of the artifacts is built,
encrypt the key manifest with a manifest key, and
upon a life-cycle change happening to one out of the group comprising one of the artifacts and one of the interdependent cryptographic keys in the key manifest of the one of the artifacts,
    decrypt the key manifest, and
    invoke an action to a related one out of the group comprising the one of the artifacts and at least one of the interdependent cryptographic keys in accordance with the key manifest.

What is claimed is:

1. A computer-implemented method for managing a life-cycle of at least in parts interdependent cryptographic keys, wherein each of said interdependent cryptographic keys is signed and relates to a different one of artifacts, the method comprising:
- creating a key manifest, wherein said key manifest comprises data about determined dependencies of said interdependent cryptographic keys at a point in time when one of said artifacts is built;
- encrypting said key manifest with a manifest key; and
- upon a life-cycle change happening to one out of a group comprising one of said artifacts and one of said interdependent cryptographic keys in said key manifest of said one of said artifacts, wherein said life-cycle change is an expiration of said interdependent cryptographic keys at the point in time due to a predefined expiration;
- decrypting said key manifest; and
- invoking an action to a related one out of said group comprising said one of said artifacts and at least one of said interdependent cryptographic keys in accordance with said key manifest, wherein said action to said one of said artifacts is a building or modifying said one of said artifacts or a deployment of said one of said artifacts, wherein said action to said at least one of said interdependent cryptographic keys comprises an encryption or decryption of the data, and wherein a resulting key manifest comprises a reference to said data.

2. The method according to claim 1, wherein said one of said artifacts is encrypted.

3. The method according to claim 1, wherein said manifest key encrypts only a part of said key manifest.

4. The method according to claim 1, wherein said action comprises:
- creating a new key.

5. The method according to claim 1, wherein said action to said at least one of said interdependent cryptographic keys is a change of one of said interdependent cryptographic keys.

6. The method according to claim 1, wherein said key manifest is a combination of a plurality of key manifests.

7. The method according to claim 6, wherein said key manifest comprises a certificate which was used to validate dependent key manifests.

8. The method according to claim 1, wherein each of said interdependent cryptographic keys is one selected out of a group comprising a login credential, an API token, and a hardware security module protected key.

9. A distributed linked manifest system for managing a life-cycle of interdependent cryptographic keys, wherein each of said interdependent cryptographic keys is signed and relates to a different one of artifacts, said system comprising:
- one or more processors, one or more computer-readable memories and one or more computer-readable storage media;
- program instructions, stored on at least one or more of the one or more storage media for execution by at least one of the one or more processors via at least one of the one or more memories, to create a key manifest, wherein said key manifest comprises data about determined dependencies of said interdependent cryptographic keys at a point in time when one of said artifacts is built;
- program instructions, stored on at least one or more of the one or more storage media for execution by at least one of the one or more processors via at least one of the one or more memories, to encrypt said key manifest with a manifest key; and
- upon a life-cycle change happening to one out of a group comprising one of said artifacts and one of said interdependent cryptographic keys in said key manifest of said one of said artifacts, wherein said life-cycle change is an expiration of said interdependent cryptographic keys at the point in time due to a predefined expiration;
- program instructions, stored on at least one or more of the one or more storage media for execution by at least one of the one or more processors via at least one of the one or more memories, to decrypt said key manifest; and
- program instructions, stored on at least one or more of the one or more storage media for execution by at least one of the one or more processors via at least one of the one or more memories, to invoke an action to a related one out of said group comprising said one of said artifacts and at least one of said interdependent cryptographic keys in accordance with said key manifest, wherein said action to said one of said artifacts is a building or modifying said one of said artifacts or a deployment of said one of said artifacts, wherein said action to said at least one of said interdependent cryptographic keys comprises an encryption or decryption of the data, and wherein a resulting key manifest comprises a reference to said data.

10. The system according to claim 9, wherein said one of said artifacts is encrypted.

11. The system according to claim 9, wherein said manifest key encrypts only a part of said key manifest.

12. The system according to claim 9, wherein said action comprises:
- creating a new key.

13. The system according to claim 9, wherein said action to said at least one of said interdependent cryptographic keys is a change of one of said interdependent cryptographic keys.

14. A computer program product for managing a life-cycle of interdependent cryptographic keys, wherein each of said cryptographic keys is signed and relates to a different one of artifacts, said computer program product comprising:
- one or more computer readable storage media;
- program instructions, stored on at least one of the one or more storage media, to create a key manifest, wherein said key manifest comprises data about determined dependencies of said cryptographic keys at a point in time when one of said artifacts is built;
- program instructions, stored on at least one of the one or more storage media, to encrypt said key manifest with a manifest key; and
- upon a life-cycle change happening to one out of a group comprising one of said artifacts and one of said interdependent cryptographic keys in said key manifest of said one of said artifacts, wherein said life-cycle change is an expiration of said interdependent cryptographic keys at the point in time due to a predefined expiration:
- program instructions, stored on at least one of the one or more storage media, to decrypt said key manifest; and
- program instructions, stored on at least one of the one or more storage media, to invoke an action to a related one out of said group comprising said one of said artifacts and at least one of said interdependent cryptographic keys in accordance with said key manifest, wherein said action to said one of said artifacts is a building or modifying said one of said artifacts or a deployment of said one of said artifacts, wherein said action to said at least one of said interdependent cryptographic keys comprises an encryption or decryption of the data, and wherein a resulting key manifest comprises a reference to said data.

\* \* \* \* \*